United States Patent
Chen et al.

(10) Patent No.: US 9,379,842 B2
(45) Date of Patent: Jun. 28, 2016

(54) OUTER-LOOP ADJUSTMENT FOR WIRELESS COMMUNICATION LINK ADAPTATION

(71) Applicant: Telefonaktiebolaget L M Ericsson (publ), Stockholm (SE)

(72) Inventors: Xixian Chen, Ottawa (CA); Hong Ren, Kanata (CA); Edward Mah, Kanata (CA); Shiguang Guo, Ottawa (CA); Ping Yu, Ottawa (CA); Guoqiang Lu, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 246 days.

(21) Appl. No.: 14/067,449

(22) Filed: Oct. 30, 2013

(65) Prior Publication Data
US 2015/0117321 A1    Apr. 30, 2015

(51) Int. Cl.
*H04L 1/00* (2006.01)
*H04L 1/18* (2006.01)

(52) U.S. Cl.
CPC .............. *H04L 1/0013* (2013.01); *H04L 1/002* (2013.01); *H04L 1/0033* (2013.01); *H04L 1/1893* (2013.01)

(58) Field of Classification Search
None
See application file for complete search history.

(56) References Cited

U.S. PATENT DOCUMENTS

| | | | |
|---|---|---|---|
| 6,622,024 B2 | 9/2003 | Koo et al. | |
| 7,197,327 B2 | 3/2007 | Koo et al. | |
| 7,423,976 B2 | 9/2008 | Wang et al. | |
| 7,801,548 B2 | 9/2010 | Koo et al. | |
| 8,265,681 B2 | 9/2012 | Wang et al. | |
| 8,270,507 B2 | 9/2012 | Schneider et al. | |
| 8,675,794 B1 * | 3/2014 | Perets et al. | 375/349 |
| 2003/0123598 A1 * | 7/2003 | Gollamudi et al. | 375/377 |
| 2004/0121794 A1 * | 6/2004 | Koo et al. | 455/522 |
| 2005/0215276 A1 * | 9/2005 | Koo et al. | 455/522 |

(Continued)

FOREIGN PATENT DOCUMENTS

| | | |
|---|---|---|
| EP | 2 112 778 A2 | 10/2009 |
| GB | 2 433 383 A1 | 6/2007 |
| GB | 2 457 759 A1 | 9/2009 |

(Continued)

OTHER PUBLICATIONS

International Search Report and Written Opinion dated Jul. 17, 2015 for International Application Serial No. PCT/IB2014/066059, International Filing Date—Nov. 14, 2014 consisting of 10-pages.

(Continued)

*Primary Examiner* — Jeffrey M Rutkowski
*Assistant Examiner* — Ning Li
(74) *Attorney, Agent, or Firm* — Christopher & Weisberg, P.A.

(57) ABSTRACT

A method and base station for adjusting outer-loop adjustment values used for link adaptation in a wireless communication network is provided. A modulation of a user equipment is determined and a success or failure of a Transport Block (TB) based on a TB feedback message is determined. Based on the TB feedback, one of an acknowledgement counter and a non-acknowledgement counter is incremented corresponding to the determined modulation. An upward step size for the determined modulation is updated based on the respective acknowledgement counter and the non-acknowledgement counter to affect link adaption.

22 Claims, 3 Drawing Sheets

(56) References Cited

U.S. PATENT DOCUMENTS

| | | | |
|---|---|---|---|
| 2013/0028307 A1* | 1/2013 | Ren et al. .................... | 375/224 |
| 2013/0170469 A1* | 7/2013 | Yu et al. ...................... | 370/330 |
| 2013/0182569 A1* | 7/2013 | Bertrand et al. ............. | 370/232 |
| 2013/0310092 A1* | 11/2013 | Tabet et al. .................. | 455/501 |

FOREIGN PATENT DOCUMENTS

| | | | |
|---|---|---|---|
| WO | 03096598 A1 | 11/2003 | |
| WO | 2006055718 A2 | 5/2006 | |

OTHER PUBLICATIONS

Kari Aho, et al., "CQI Reporting Imperfections and their Consequences in LTE Networks," ICN 2011: The Tenth International Conference on Networks, pp. 241-245 Copyright (c) IARIA, 2011 ISBN:978-1-61208-113-7.

International Search Report and Written Opinion dated Dec. 22, 2014 for International Application No. PCT/IB2014/064398, International Filing Date: Sep. 10, 2014 consisting of 11-pages.

* cited by examiner

OUTER-LOOP ADJUSTMENT FOR WIRELESS COMMUNICATION LINK ADAPTATION

TECHNICAL FIELD

The present invention relates to wireless communication, and in particular, to methods and devices for outer-loop adjustment for wireless communication link adaptation.

BACKGROUND

Link adaptation is an important Radio Resource Management (RRM) function in wireless communication systems for reliable communication. The purpose of link adaptation is to determine the appropriate modulation and coding scheme (MCS) to maximize user data throughput or data rate. In a typical system that utilizes Hybrid Automatic Repeat Request (HARQ), the task of link adaptation is to determine the MCS that will provide the highest data transmission rate for which the targeted operating point, e.g., block error rate (BLER) after certain number of HARQ transmissions, can be achieved. To perform link adaptation, information about the communication link quality is required. This may be obtained either from measurements at the transmitter or reports of Channel State Information (CSI) from receiver to transmitter. To achieve high throughput, link adaptation may be performed in every transmission time interval (TTI).

A downlink (DL) link quality can be determined from reported CSI from user equipment (UE). A methodology for evaluating link quality is not defined by communication standards, and, therefore, can vary from vendor to vendor. Some UEs may report optimistic CSI while other types of UEs may report pessimistic CSI. The CSI reported by the UE is typically mapped to a channel quality measure, e.g., signal to interference plus noise ratio (SINR), by the transmitter. To achieve a target BLER, a control loop, called an outer-loop, may be utilized that makes additional adjustments to the channel quality measure obtained from the reported CSI based on the transmission successes and failures.

For example, SINR is increased by an upward step when a transmission for a transport block (TB) is successful while it is decreased by a downward step when a transmission for a TB fails. A HARQ transmission for a TB is considered successful from an outer-loop perspective if a HARQ feedback of positive acknowledgement (ACK) is received before exceeding a target number of HARQ transmissions. A HARQ transmission for a TB is considered failed if the HARQ feedback is still a negative acknowledgment (NACK) when the target number of HARQ transmission is reached. If no positive acknowledgement (ACK) is received before the target number of HARQ transmission and no HARQ feedback signal is detected when the target number of HARQ transmission is reached, the HARQ transmission for a TB is neither a success nor a failure. The upward adjustment steps are determined based on the target BLER. For example, one downward step is set to nine upward steps with a target BLER of 10%.

In an ideal case, the estimated SINR is perfect. In other words, the actual BLER is exactly the target BLER when the highest MCS supported by the radio link is selected. In such a case, the SINR adjustment by outer-loop converges to zero since the downward adjustment completely cancels the upward adjustment. Thus, the downward adjustment and upward adjustment correspond to the target (and actual) BLER.

In real world deployments, the estimated SINR can be either too high (optimistic) or too low (pessimistic). When the estimated SINR is optimistic, if, for example, the target BLER is 10%, then the actual BLER is higher than 10%, and the overall SINR adjustment by the outer-loop becomes negative, correcting the estimated SINR to make it less optimistic. Similarly, when the estimated SINR is pessimistic, assuming again that the target BLER is 10%, the actual BLER is lower than 10% and the overall SINR adjustment by outer-loop becomes positive, correcting the estimated SINR to make it less pessimistic.

A higher BLER for larger Transport Block Sizes (TBSs), which tend to use higher modulations and coding rates, is a phenomenon that exists in practically all digital radio communication systems. Depending on the specific radio environment and the ability of the system to adapt to a varying channel quality, the magnitude will vary.

Larger transport block sizes that tend to use higher modulation, e.g., 64QAM, are chosen for higher radio qualities (higher CQI values). Due to the varying radio channel, the probability of experiencing a worse radio quality than expected depends on the reported radio quality. The higher the quality that is measured and reported, the higher the probability that the quality will degrade and be lower than when the block is actually transmitted over the radio interface, which is, in other words, an over-estimation of channel quality.

A same contribution is made for the lower part of the radio quality distribution. Smaller block sizes that use the lower modulation, e.g., QPSK, are chosen when the quality is low, and the probability that the channel will be improved at the moment of transmission increases.

Generally, if a UE reports a higher CQI that corresponds to 64QAM, it tends to report the optimistic radio quality. Consequently, the 64QAM would have higher HARQ retransmission rate than 16QAM and QPSK. On the other hand, if a UE reports a lower CQI that corresponds to QPSK, it tends to report the pessimistic radio quality. As a result, the HARQ retransmission rate for QPSK would be lower than that of 16QAM and 64QAM.

Existing solutions use channel quality, e.g., gain to interference plus noise ratio (GINR), estimation and link adaptation that consists of receiving, by the Evolved Node B (eNodeB), a CQI report from the UE. The CQI is mapped to SINR using a table derived from receiver link models. The GINR is then derived from the SINR by subtracting the power spectrum density of the reference signal. A smoothing filter is applied to GINR to allow for slow fading of the adaptation. HARQ ACK/NACK feedback is used to adjust GINR to counteract systematic errors between UE measurement and eNodeB link adaptation.

Thus, the derived GINR estimate is used to calculate link qualities for all modulation modes, e.g., QPSK, 16QAM, and 64QAM. A drawback of this method is that the link quality calculation for the higher throughput modulation, e.g., 64QAM, tends to be overestimated, and the link quality calculated for the lower throughput modulation, e.g., QPSK, tends to be underestimated. The overestimated or underestimated link quality is used by the link adaptation function to determine the largest allowable number of symbols, SBs, and the corresponding MCS that should be used for efficient utilization of resources. Thus, a more aggressive MCS, i.e., having a higher data throughput rate, may be selected for a larger TBS with higher modulation, and a more conservative MCS, i.e., having a lower data throughput rate, may be selected for a smaller TBS with lower modulation. A consequence of such an arrangement is that the actual BLER for a high throughput modulation may be higher than the target BLER, and the actual BLER for a low throughput modulation may be lower than the target BLER, which would degrade the overall cell throughput. A solution to more accurately measure channel quality to improve cell throughput is needed.

SUMMARY

The present invention relates to an outer-loop adjustment for wireless communication link adaptation. In accordance with one embodiment of the present invention, a method of adjusting outer-loop adjustment values used for link adaptation in a wireless communication network includes determining a Modulation and Coding Scheme, MCS, for a User Equipment, UE. A Transport Block, TB, feedback message is received at a base station. It is determined whether the TB feedback message indicates one of a successful transmission and an unsuccessful transmission. If the TB feedback message indicates the successful transmission, an acknowledgement counter corresponding to a modulation determined from the MCS is incremented. If the TB feedback message indicates the unsuccessful transmission, a non-acknowledgement counter corresponding to the modulation is incremented. One of an upward step size and a downward step size for the modulation is updated based on the respective acknowledgement counter and the respective non-acknowledgement counter. The outer-loop adjustment values using the upward step size and the downward step size will affect link adaptation.

In accordance with an aspect of this embodiment, if the TB feedback message indicates a successful transmission, the outer-loop adjustment value is adjusted by the upward step size corresponding to the determined modulation. If the TB feedback message indicates an unsuccessful transmission, the outer-loop adjustment value is adjusted by the downward step size. In accordance with another aspect of this embodiment, a channel State Indicator, CSI, is received from the UE. An initial signal to interference plus noise ratio, SINR, is determined based on the received CSI. A final SINR is determined by adding the outer-loop adjustment value to the initial SINR. In accordance with yet another aspect of this embodiment, an estimated block error rate, BLER, for the modulation is calculated based on the acknowledgement counter and the non-acknowledgement counter for the respective modulation. The upward step size is calculated for the modulation based on the respective estimated BLER.

In accordance with still another aspect of this embodiment, the estimated BLER for the modulation is calculated by $BLER=BLER_P*(1-a)+a*nack\_count/M$ and $BLER_P=BLER$. Where BLER equals the estimated BLER. $BLER_P$ equals a previously estimated BLER. a equals a forgetting factor. nack_count equals the non-acknowledgement counter. M equals a sum of the acknowledgement counter and the non-acknowledgement counter.

In accordance with an aspect of this embodiment, the upward step size for the modulation is updated using a geometric mean method calculated by $BLER_A=(BLER_T)^2/BLER$; and $up\_step=down\_step*BLER_A/(1-BLER_A)$. Where $BLER_A$ equals an adjusted target BLER. $BLER_T$ equals a target BLER. up_step equals an upward step size for the respective modulation. down_step equals a downward step size for the respective modulation.

In accordance with another aspect of this embodiment, the upward step size for the modulation is updated using an arithmetic mean method calculated by $BLER_A=2*BLER_T-BLER$ and $up\_step=down\_step*BLER_A/(1-BLER_A)$. Where BLER equals an estimated BLER. $BLER_A$ equals an adjusted target BLER. $BLER_T$ equals a target BLER. up_step equals an upward step size for the respective modulation. down_step equals a downward step size for the respective modulation.

In accordance with yet another aspect of this embodiment, the upward step size for the modulation is updated using a greedy method calculated by decreasing up_step by an interval if $BLER>BLER_T+$a first threshold value; and increasing up_step by the interval if $BLER<BLER_T-$a second threshold value. Where BLER equals the estimated BLER. $BLER_T$ equals a target BLER. up_step equals an upward step size for the respective modulation.

In accordance with still another aspect of this embodiment, the estimated BLER for the modulation is calculated for one of each UE in a cell of the wireless communication network, a group of UEs in a cell of the wireless communication network, and all UEs in a cell of the wireless communication network. In accordance with an aspect of this embodiment, the modulation is one of a plurality of modulations. Each of the plurality of modulations includes a corresponding target BLER.

In accordance with another embodiment, a base station includes a receiver in communication with a mobile device. The base station includes a receiver configured to receive a Transport Block, TB, feedback message from the mobile device. The base station includes a processor in communication with the receiver. The processor is configured to determine a modulation of the mobile device. The modulation is based on a Modulation and Coding Scheme, MCS. The processor is configured to determine whether the TB feedback message indicates one of a successful transmission and an unsuccessful transmission. An acknowledgement counter corresponding to the modulation is incremented if the TB feedback message indicates the successful transmission. A non-acknowledgement counter corresponding to the modulation is incremented if the TB feedback message indicates the unsuccessful transmission. An upward step size for the modulation is updated based on the respective acknowledgment counter and the respective non-acknowledgement counter.

In accordance with an aspect of this embodiment, the processor is further configured to adjust an outer-loop adjustment value by the updated upward step size if the TB feedback message indicates a successful transmission. The outer-loop adjustment value is adjusted by a downward step size if the TB feedback message indicates an unsuccessful transmission. In accordance with another aspect of this embodiment, the processor is further configured to determine, for the modulation, whether a sum of the acknowledgment counter and the non-acknowledgement counter exceeds a threshold value. An estimated block error rate, BLER, for the modulation based on the acknowledgement counter and the non-acknowledgement counter is calculated for the respective modulation.

In accordance with yet another aspect of this embodiment, the estimated BLER for the modulation is calculated by calculating $BLER=BLER_P*(1-a)+a*nack\_count/M$ and $BLER_P=BLER$. Where BLER equals the estimated BLER. $BLER_P$ equals a previously estimated BLER. a equals a forgetting factor. nack_count equals the non-acknowledgement counter. M equals a sum of the acknowledgement counter and the non-acknowledgement counter.

In accordance with still another aspect of this embodiment, the processor is configured to calculate the estimated BLER for one of each mobile device in communication with the base station, a group of mobile devices in communication with the base station, and all mobile devices in communication with the base station. In accordance with an aspect of this embodiment, the modulation is one of a plurality of modulations and each of the plurality of modulations includes a corresponding target BLER.

In accordance with another embodiment, a method of link adaptation in a wireless communication network includes determining an Modulation and Coding Scheme, MCS, including a modulation, of a User Equipment, UE. A Transport Block, TB, feedback message is received, from the UE, at a base station. The TB feedback message indicates one of a successful transmission and an unsuccessful transmission. One of an acknowledgement counter and a non-acknowledgement counter is incremented based on the TB feedback message. The acknowledgement counter and the non-acknowledgement counter correspond to the determined modulation. An estimated Block Error Rate, BLER, of the modulation based on the acknowledgement counter and the non-acknowledgment counter of the modulation is determined. An outer-loop adjustment value of the modulation is adjusted based on the TB feedback message. A final channel quality value is determined by adding the outer-loop adjustment value to a measured channel quality value.

In accordance with an aspect of this embodiment, the estimated BLER of the modulation is determined by calculating $BLER=BLER_P*(1-a)+a*nack\_count/M$; and $BLER_P=BLER$. Where, BLER equals the estimated BLER. $BLER_P$ equals a previously estimated BLER. a equals a forgetting factor. nack_count equals the non-acknowledgement counter. M equals a sum of the acknowledgement counter and the non-acknowledgement counter.

In accordance with another aspect of this embodiment, the MCS including the modulation is determined by a measured signal to interference plus noise ratio, SINR, plus the outer-loop adjustment value. In accordance with yet another aspect of this embodiment, adjusting the outer-loop adjustment value includes updating an upward step size for the modulation based on the acknowledgement counter and the non-acknowledgement counter. In accordance with still another aspect of this embodiment, updating the upward step size uses one of a geometric mean method, an arithmetic mean method and a greedy method.

In accordance with an aspect of this embodiment, the estimated BLER of the modulation is calculated for one of each UE of the wireless communication network, a group of UEs of the wireless communication network, and all UEs in a cell of the wireless communication network. In accordance with another aspect of this embodiment, the modulation is one of a plurality of modulations. Each of the plurality of modulations includes a corresponding target BLER.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and "connected to," and the like, may be used to indicate electrical or data communication, which may be accomplished by physical contact, induction, electromagnetic radiation, radio signaling, infrared signaling or optical signaling, for example. The above methods of achieving electrical or data communication are non-limiting and mentioned only for illustration. One having ordinary skill in the art will appreciate that multiple components may interoperate and modifications and variations are possible of achieving the electrical and data communication.

Figure 1:
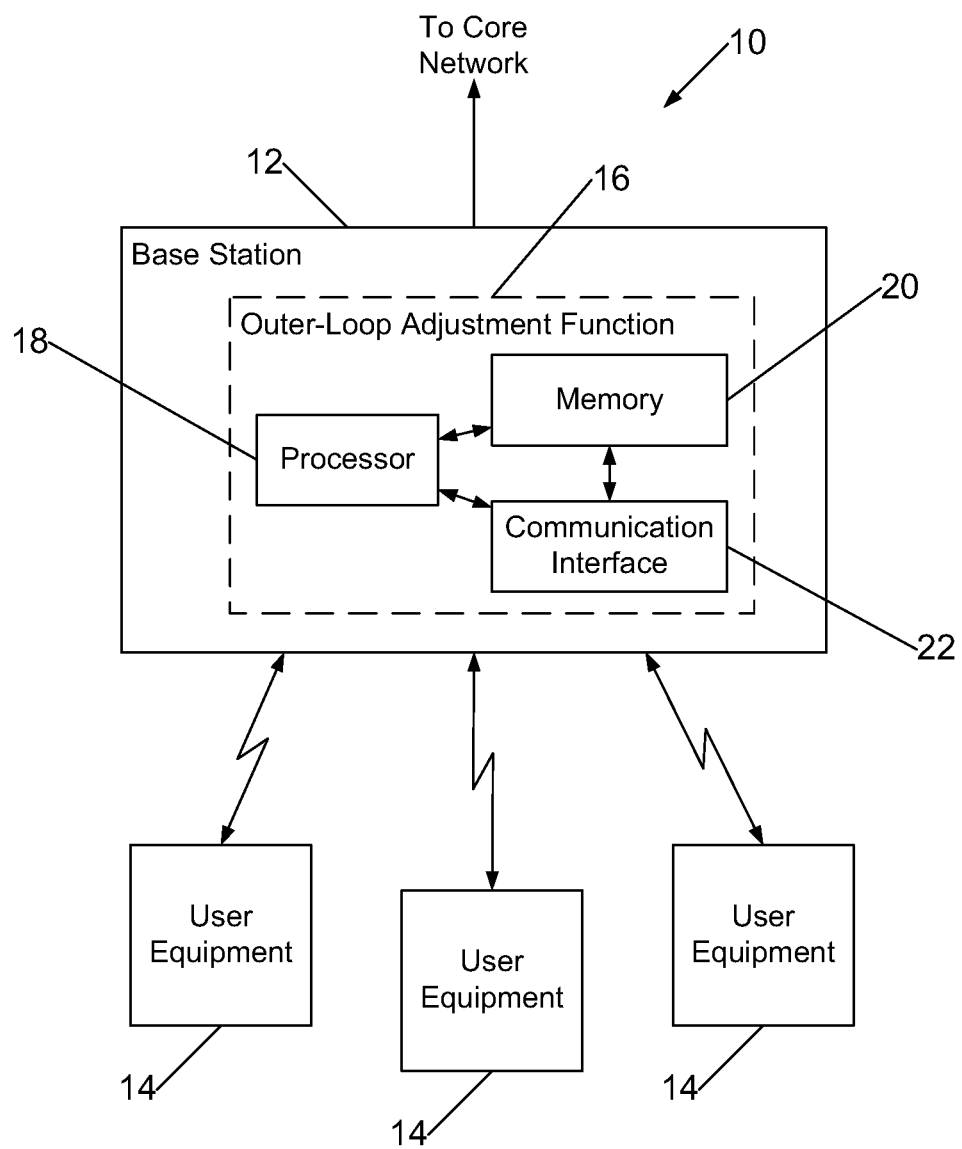
FIG. 1 is a block diagram of a communication system constructed in accordance with principles of the present invention.

Referring to the drawing figures in which like reference designators refer to like elements, FIG. 1 shows a block diagram of a communication system 10 according to an exemplary embodiment of the present invention. In one embodiment, communication system 10 is a Long Term Evolution (LTE) network. The invention is not limited to such. It is contemplated that other networking technologies, such as other network types compliant with $3^{rd}$ Generation Partnership Project (3GPP) specifications can be implemented as communication system 10. The communication system 10 includes a base station 12 in communication with one or more user equipments (UE) 14. The base station 12 may be part of a Radio Access Network (RAN) (not pictured) that is in communication with a Core Network (CN) (not pictured) and may be, for example, an Evolved Node B (eNodeB), which may be in communication with a core network in an LTE network. The base station provides the air interface for the UE 14 and communicatively couples the UE to a CN, for example. The base station 12 includes an outer-loop adjustment function module 16 for controlling adaptation of the wireless communication link between the base station 12 and the UE 14.

The outer-loop adjustment function module 16 may be implemented, for example, in hardware on a processor 18 or as a combination of hardware and software. Programmatic code to implement aspects of the outer-loop adjustment function module 16, including the functions of the processor 18 can be stored in a memory 20. The memory 20 may be any volatile or non-volatile storage device capable of storing data including, for example, solid-state memory, optical storage and magnetic storage. The outer-loop adjustment function module 16 may utilize a communication interface 22 to determine characteristics of the communication link, such as the channel quality between the base station 12 and the UE 14. The communication interface 22 may also be used for data communication between the base station 12 and the UE 14.

A conventional algorithm for measuring channel quality uses fixed upward and downward step sizes for outer-loop adjustment for all the modulation modes. The upward step size (up_step) is calculated based on a target block error rate (BLER) and the downward step size (down_step) according to:

$$up\_step=down\_step*target\_BLER/(1-target\ BLER). \qquad (Eq.\ 1)$$

According to embodiments of the present invention, the up_step for each modulation is updated based on the estimated BLER for each modulation, respectively, instead of the fixed value calculated from the target BLER according to Eq. 1.

An exemplary flow chart of a process for updating an outer-loop adjustment step size in accordance with principles of the present invention is described with reference to FIG. 2. The communication interface 22 receives a Transport Block (TB) feedback (block S100) from the UE 14. The TB feedback indicates whether a TB was successfully transmitted or unsuccessfully transmitted. It will be appreciated that the TB feedback is in response to a TB sent to the UE (not pictured). The outer-loop adjustment function module 16 determines, based on the TB feedback whether the TB was successful (block S102) and determines a modulation of the TB (block S104, S106). In particular, if the TB feedback indicates that the TB was successfully transmitted, the outer-loop adjustment function module 16 determines the TB modulation (block S104). If the TB feedback indicates that the TB was unsuccessfully transmitted, the outer-loop adjustment function module 16 determines the TB modulation (block S106). The determined modulation in S104 and S106 may be, for example, QPSK (quadrature phase-shift keying), 16QAM (quadrature amplitude modulation), and 64QAM. Although three types of modulation are shown, it will be appreciated that other modulation schemes may also be included in the outer-loop adjustment in accordance with principles of the present invention. Depending on whether the TB transmission feedback was successful, and the modulation of the TB, either an acknowledgement counter (ACK) or a non-acknowledgement counter (NACK) is incremented that corresponds to the modulation (block S108, S110). The incremented ACK counters have associated indexes relating the counter to the determined modulation. In other words, ACK (1) corresponds to 64QAM, ACK(2) corresponds to 16QAM and ACK(3) corresponds to QPSK. Thus, if the TB feedback indicates that the TB was successfully transmitted and the TB modulation is 64QAM, ACK(1) is incremented. Accordingly, if the TB feedback indicates that the TB was successfully transmitted and the TB modulation is 16QAM, ACK(2) is incremented. If the TB feedback indicates that the TB was successfully transmitted and the TB modulation is QPSK, ACK(3) is incremented. It will be appreciated that the NACK counters similarly have an associated index relating the NACK counter to the determined modulation. Thus, if the TB feedback indicates that the TB was not successfully transmitted and the TB modulation is 64QAM, NACK(1) is incremented. If the TB feedback indicates that the TB was not successfully transmitted and the TB modulation is 16QAM, NACK(2) is incremented. If the TB feedback indicates that the TB was not successfully transmitted and the TB modulation is QPSK, NACK(3) is incremented.

The outer-loop adjustment function module 16 initializes a modulation index (block S112). The outer-loop adjustment function module 16 then calculates a sum of the ACK counter and the NACK counter corresponding to the modulation index (block S114). In this way, a sum of the ACK and NACK counters is calculated for a modulation that corresponds to the modulation index. The outer-loop adjustment function module 16 compares the sum of the ACK and NACK counters against a threshold value (block S116). The threshold value may be established for each modulation index. In other words, the threshold value may be different for each modulation (i.e., 64QAM, 16QAM and QPSK). According to some exemplary embodiments, the threshold value is identical across all modulations.

If the sum of the ACK and NACK counters exceeds the threshold value, the outer-loop adjustment function module 16 determines a calculated block error rate (BLER) (block S118) based on a previous block error rate, a forgetting factor, the NACK counter and the sum of the ACK and NACK counters as shown below in Eq. 2. The outer-loop adjustment function module 16 also resets the ACK and NACK counters and $BLER_P(i)$:

$$BLER(i)=BLER_P(i)*(1-a(i))+a(i)*\text{nack\_count}(i)/M; \quad \text{(Eq. 2)}$$

$$BLER_P(i)=BLER(i); \quad \text{(Eq. 2.1)}$$

$$\text{ack\_count}(i)=0;\text{nack\_count}(i)=0. \quad \text{(Eq. 2.2)}$$

Where, $BLER(i)$ is a calculated (or estimated) BLER for all modulation and coding schemes (MCSs) corresponding to the modulation index i;

$BLER_P(i)$ is a previously calculated BLER that corresponds to the modulation index i;

ack_count(i) is the total number of ACKs received for all the MCSs corresponding to the modulation index i;

nack_count(i) is the total number of NACKs received for all the MCSs corresponding to the modulation index i;

$a(i)$ is a forgetting factor for updating the $BLER(i)$ and is a value between 0 and 1 that smooths transitions between the previously calculated BLER, $BLER_P$, and the calculated BLER, $BLER(i)$, and is a convergence rate of the calculated BLER to the actual BLER; and M is a sum of the ACK counter and NACK counters.

It will be appreciated that in some exemplary embodiments, the previously calculated BLER, $BLER_P(i)$ may be initially set as the target BLER.

After the calculated BLER is determined, the outer-loop adjustment function module 16 increments the modulation index (block S120) and determines whether all the modulation indexes have been considered (block S122). The outer-loop adjustment function module 16 adjusts an upward step size of the outer-loop adjustment for each modulation (block S124). The upward step size for each modulation may be calculated using different methods including, for example, a geometric mean method, an arithmetic mean method and a greedy method.

In the calculations described herein, Adj_BLER is an adjusted BLER; target_BLER is the target BLER; BLER(i) is the calculated BLER for the modulation index i; up_step(i) is the upward step size of the outer-loop adjustment for the modulation index i; down_step is the downward step size for all modulations of the outer-loop adjustment; BLER_TH1 is a first BLER threshold; BLER_TH2 is a second BLER threshold;

The geometric mean method first calculates an adjusted BLER based on the target BLER and the calculated BLER of the modulation index, as:

$$\text{Adj\_BLER}=\text{target\_BLER}^2/BLER(i). \quad \text{(Eq. 3)}$$

The geometric mean method then calculates the upward step size based on the adjusted BLER calculated above and the downward step size of the outer-loop adjustment as:

$$\text{up\_step}(i)=\text{down\_step}*\text{Adj\_BLER}/(1-\text{Adj\_BLER}). \quad \text{(Eq. 4)}$$

The arithmetic mean method first calculates an adjusted BLER based on the target BLER and the calculated BLER of the modulation index, as:

$$\text{Adj\_BLER}=2*\text{target\_BLER}-BLER(i). \quad \text{(Eq. 5)}$$

The arithmetic mean method then calculates the upward step size based on the adjusted BLER calculated above and the downward step size of the outer-loop adjustment as:

$$\text{up\_step}(i)=\text{down\_step}*\text{Adj\_BLER}/(1-\text{Adj\_BLER}). \quad \text{(Eq. 6)}$$

The greedy method utilizes threshold values BLER_TH1 and BLER_TH2 to establish boundaries around the target BLER, and if the calculated BLER exceeds the boundaries, the up_step is incremented or decremented. Exemplary pseudo-code for implementing the greedy method is shown as:

```
if (BLER(i) > target_BLER + BLER_TH1)
    up_step(i) -= delta
else if BLER(i) < target_BLER - BLER_TH2)
    up_step(i) += delta
end.
```

The value delta may be a predetermined value that is a fraction of the channel quality measure.

It will be appreciated that the upward step size is determined for each modulation index i, such that an upward step size is separately determined for each modulation, i.e., 64QAM, 16QAM and QPSK. It will be further appreciated that according to some exemplary embodiments, the upward step size may be calculated for a modulation index after the BLER is calculated for the modulation index. In other words, the upward step size is calculated, e.g., by geometric mean, arithmetic mean or greedy method, only when the sum of the ACK and NACK counters exceeds the threshold value (block S116) and after the calculated block error rate is determined (block S118).

Thus, the upward step size of the outer-loop adjustment values corresponding to each modulation is adjusted based on the calculated BLER for the respective modulation. Because the upward step size for each modulation is adjusted the upward step size should, accordingly, be applied to the outer-loop adjustment of the channel quality measure based on the modulation.

An exemplary flow chart of a process of adjusting the channel quality measure using the outer-loop adjustment in accordance with principles of the present invention is described with reference to FIG. 3. The outer-loop adjustment function module 16 initializes the out-loop adjustment value to zero (block S126). The communication interface 22 receives a TB transmission feedback (block S128). As before, the TB feedback indicates whether a TB was successfully transmitted or unsuccessfully transmitted. The outer-loop adjustment function module 16 determines, based on the TB feedback whether the TB feedback was successful (block S130). If the TB feedback was successful, the outer-loop adjustment function module 16 determines a modulation of the TB (block S132). The determined modulation includes, for example, QPSK, 16QAM and 64QAM. Based on the determined modulation, the outer-loop adjustment value is incremented by the upward step size corresponding to the modulation (block S134). In particular, if the modulation is 64QAM, the outer-loop adjustment value is adjusted by the upward step size corresponding to the 64QAM modulation, i.e., OL_adj+=up_step(1). If the modulation is 16QAM, the outer-loop adjustment value is adjusted by the upward step size corresponding to the 16QAM modulation, i.e., OL_adj+= up_step(2). If the modulation is QPSK, the outer-loop adjustment value is adjusted by the upward step size corresponding to the QPSK modulation, i.e., OL_adj+=up_step(3).

If the TB feedback was unsuccessful, the outer-loop adjustment value is decreased by the downward step size (block S136). The outer-loop adjustment function module 16 adjusts the channel quality measure by the outer-loop adjustment value (block S138). In other words, the outer-loop adjustment value is added to the channel quality measure. The outer-loop adjustment function module 16 may determine an offset of the channel quality measure (block S140), which may be a difference between the adjusted channel quality measure and the channel quality mapped from the channel quality information (CQI) of the table derived from receiver link models. According to some exemplary embodiments, the offset may be stored in the memory 20 and recalled and added to a channel quality measure when a modulation and/or a modulation coding scheme is changed or updated.

According to other exemplary embodiments each of the calculated BLER, upward step size (up_step) calculation, the outer-loop adjustment can be performed per modulation, per group of MCSs, per rank, per transmission mode, and per channel condition. It will be appreciated that channel condition includes, for example, cell center or cell edge UEs, and high speed or low speed UEs. Thus, the upward step size calculation may be determined for different modulation, different group of MCSs, different rank, different transmission mode, different channel condition and any combination thereof. It will be further appreciated that according to some exemplary embodiments, each modulation may have a different target BLER.

Figure 2:
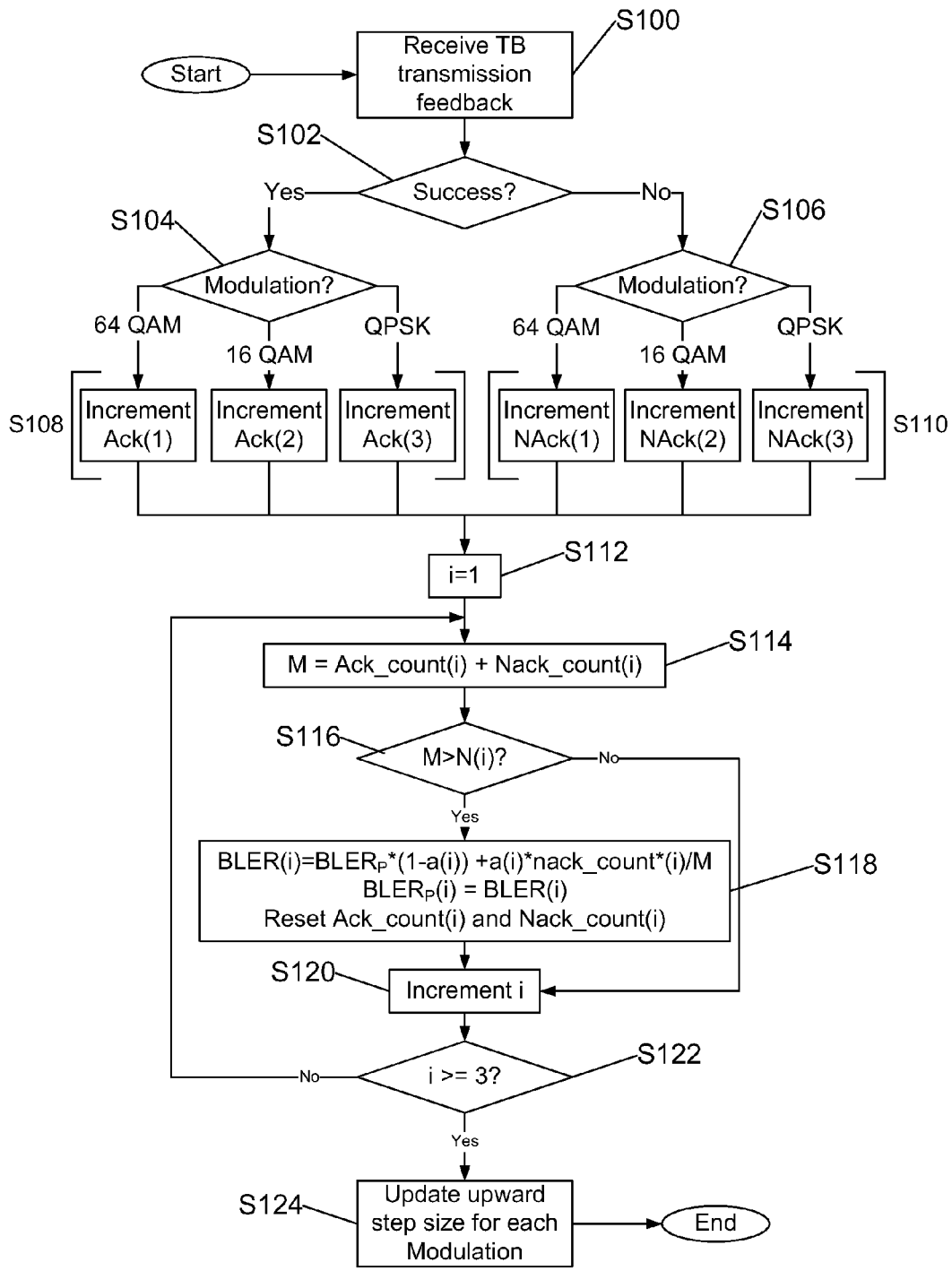
FIG. 2 is a flow chart of an exemplary process for updating an outer-loop adjustment step size in accordance with principles of the present invention.
Figure 3:
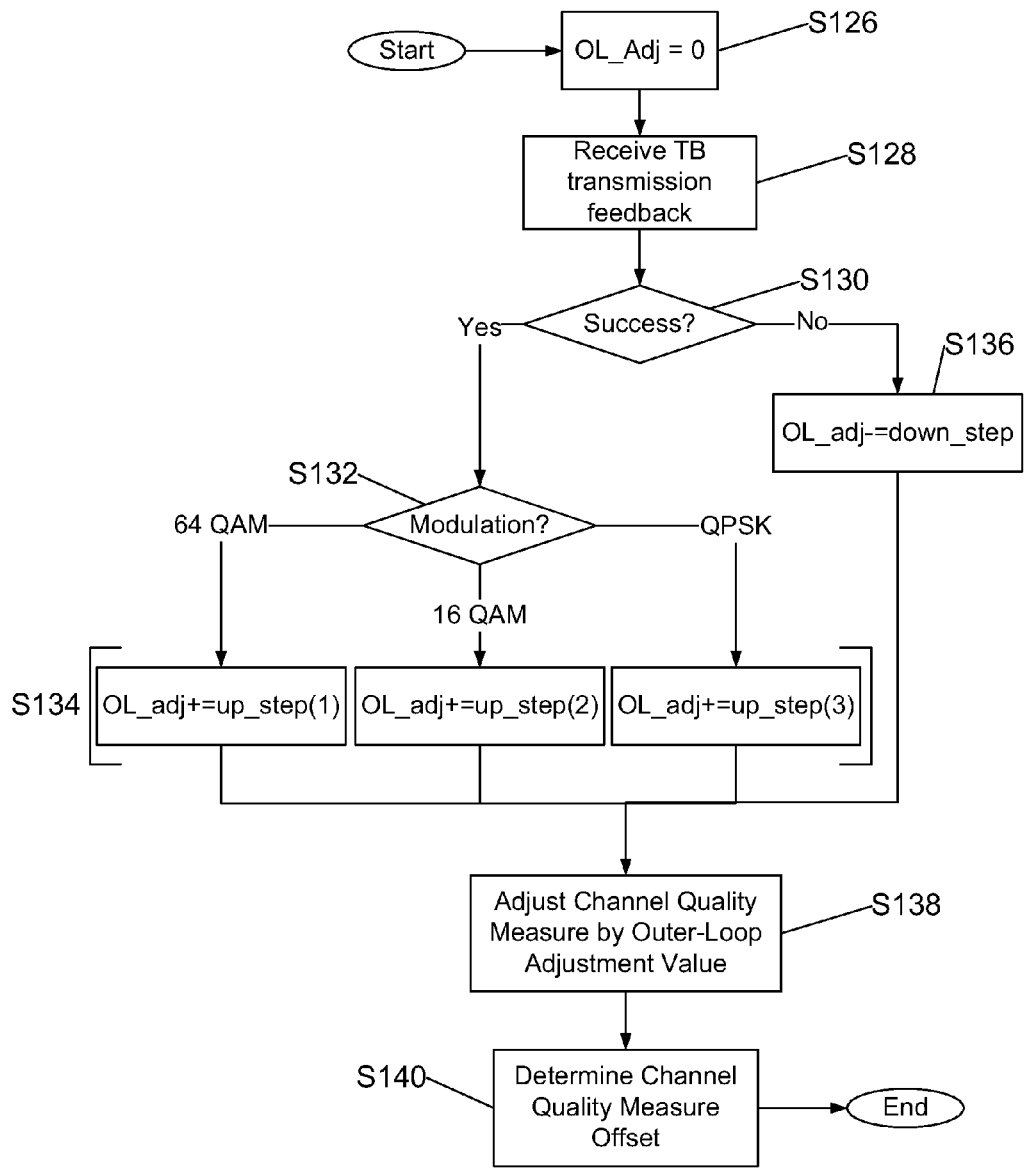
FIG. 3 is a flow chart of an exemplary process for updating a channel quality measure using an outer-loop adjustment in accordance with principles of the present invention.

Although the downward step has been described and shown in FIGS. 2 and 3 as being fixed whereas the upward step is adjusted, it will be appreciated by one having skill in the art that the converse may also be implemented. In other words, the upward step may be fixed and the downward step is adjusted based on the geometric mean method, the arithmetic mean method and the greedy method described above. It will also be appreciated that both the upward step size and the downward step size adjustment can be implemented using the methods described above.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of adjusting an outer-loop adjustment value used for link adaptation in a wireless communication network having a plurality of Modulation and Coding Schemes, MCSs, the method comprising:
    determining an MCS from the plurality of MCSs for a User Equipment, UE;
    receiving a Transport Block, TB, feedback message at a base station;
    determining whether the TB feedback message indicates one of a successful transmission and an unsuccessful transmission;
    when the TB feedback message indicates the successful transmission, incrementing an acknowledgement counter corresponding to a modulation from the determined MCS, there being a dedicated acknowledgement counter for each modulation corresponding to an MCS from the plurality of MCSs;
    when the TB feedback message indicates the unsuccessful transmission, incrementing a non-acknowledgement counter corresponding to the modulation, there being a dedicated non-acknowledgement counter for each modulation corresponding to an MCS from the plurality of MCSs;
    calculating an estimated Block Error Rate, BLER, for the modulation based on the acknowledgement counter and the non-acknowledgement counter for the respective modulation; and calculating one of an upward step size and a downward step size for the modulation based on the respective estimated BLER, the outer-loop adjustment value using at least one of the upward step size and the downward step size to affect link adaptation.

2. The method of claim 1, further comprising:
when the TB feedback message indicates the successful transmission, adjusting the outer-loop adjustment value by the upward step size corresponding to the determined modulation; and
when the TB feedback message indicates the unsuccessful transmission, adjusting the outer-loop adjustment value by the downward step size.

3. The method of claim 2, further comprising:
receiving a Channel State Indicator, CSI, from the UE;
determining an initial signal to interference plus noise ratio, SINR, based on the received CSI; and
determining a final SINR by adding the outer-loop adjustment value to the initial SINR.

4. The method of claim 1, wherein the estimated BLER for the modulation is calculated by:

$$BLER = BLER_P*(1-a) + a*\text{nack\_count}/M;$$

$$BLER_P = BLER;$$

where:
BLER=the estimated BLER;
$BLER_P$=a previously estimated BLER;
a=a forgetting factor;
nack_count=the non-acknowledgement counter; and
M=a sum of the acknowledgement counter and the non-acknowledgement counter.

5. The method of claim 1, wherein the upward step size for the modulation is updated using a geometric mean method calculated by:

$$BLER_A = (BLER_T)^2/BLER; \text{ and}$$

$$\text{up\_step} = \text{down\_step}*BLER_A/(1-BLER_A);$$

where:
BLER=an estimated BLER;
$BLER_A$=an adjusted target BLER;
$BLER_T$=a target BLER;
up_step=an upward step size for the respective modulation; and
down_step=a downward step size for the respective modulation.

6. The method of claim 1, wherein the upward step size for the modulation is updated using an arithmetic mean method calculated by:

$$BLER_A = 2*BLER_T - BLER; \text{ and}$$

$$\text{up\_step} = \text{down\_step}*BLER_A/(1-BLER_A);$$

where:
BLER=an estimated BLER;
$BLER_A$=an adjusted target BLER;
$BLER_T$=a target BLER;
up_step=an upward step size for the respective modulation; and
down_step=a downward step size for the respective modulation.

7. The method of claim 1, wherein the upward step size for the modulation is updated using a greedy method calculated by:
when $BLER > BLER_T$+a first threshold value, then decreasing up_step by an interval; and
when $BLER < BLER_T$−a second threshold value, then increasing up_step by the interval;
where:
BLER=the estimated BLER;
$BLER_T$=a target BLER; and
up_step=an upward step size for the respective modulation.

8. The method of claim 1, wherein the estimated BLER for the modulation is calculated for one of:
each UE in a cell of the wireless communication network;
a group of UEs in a cell of the wireless communication network; and
all UEs in a cell of the wireless communication network.

9. The method of claim 1, wherein the modulation is one of a plurality of modulations, each of the plurality of modulations includes a corresponding target BLER.

10. A base station for controlling link adaptation in a wireless communication network, the wireless communication network having a plurality of Modulation and Coding Schemes, MCSs, the base station including a receiver in communication with a mobile device, the base station comprising:
the receiver configured to receive a Transport Block, TB, feedback message from the mobile device; and
a processor in communication with the receiver, the processor configured to:
determine a modulation of the mobile device, the modulation being based on an MCS from the plurality of MCSs;
determine whether the TB feedback message indicates one of a successful transmission and an unsuccessful transmission;
increment an acknowledgement counter corresponding to the determined modulation when the TB feedback message indicates the successful transmission, there being a dedicated acknowledgement counter for each modulation corresponding to an MCS from the plurality of MCSs;
increment a non-acknowledgment counter corresponding to the determined modulation when the TB feedback message indicates the unsuccessful transmission, there being a dedicated non-acknowledgement counter for each modulation corresponding to an MCS from the plurality of MCSs;
calculate an estimated Block Error Rate, BLER, for the modulation based on the acknowledgement counter and the non-acknowledgement counter for the respective modulation; and
calculate one of an upward step size and a downward step size for the modulation based on the respective estimated BLER, wherein an outer-loop adjustment value is adjusted using at least one of the upward step size and the downward step size to affect the link adaptation.

11. The base station of claim 10, wherein the processor is further configured to:
adjust the outer-loop adjustment value by the calculated upward step size when the TB feedback message indicates the successful transmission; and
adjust the outer-loop adjustment value by the calculated downward step size when the TB feedback message indicates the unsuccessful transmission.

12. The base station of claim 11, wherein the processor is further configured to:
determine, for the modulation, whether a sum of the acknowledgement counter and the non-acknowledgement counter exceeds a threshold value; and calculate the estimated BLER for the modulation when the sum of the acknowledgement counter and the non-acknowledgement counter exceeds the threshold value.

13. The base station of claim 10, wherein the estimated BLER for the modulation is calculated by:

$$BLER=BLER_P*(1-a)+a*nack\_count/M; \text{ and}$$

$$BLER_P=BLER;$$

where:
BLER=the estimated BLER;
$BLER_P$=a previously estimated BLER;
a=a forgetting factor;
nack_count=the non-acknowledgement counter; and
M=a sum of the acknowledgement counter and the non-acknowledgement counter.

14. The base station of claim 10, wherein the processor is configured to calculate the estimated BLER for one of:
    each mobile device in communication with the base station;
    a group of mobile devices in communication with the base station; and
    all mobile devices in communication with the base station.

15. The base station of claim 10, wherein the modulation is one of a plurality of modulations, and each of the plurality of modulations includes a corresponding target BLER.

16. A method of link adaptation in a wireless communication network having a plurality of Modulation and Coding Schemes, MCSs, the method comprising:
    determining an MCS from the plurality of MCSs for a User Equipment, UE;
    receiving, from the UE, a Transport Block, TB, feedback message at a base station, the TB feedback message indicating one of a successful transmission and an unsuccessful transmission;
    incrementing one of an acknowledgement counter and a non-acknowledgement counter based on the TB feedback message, the acknowledgement counter and the non-acknowledgement counter corresponding to the determined modulation, there being a dedicated acknowledgement counter for each modulation corresponding to an MCS from the plurality of MCSs, and there being a dedicated non-acknowledgement counter for each modulation corresponding to an MCS from the plurality of MCSs;
    determining an estimated Block Error Rate, BLER, of the modulation based on the acknowledgement counter and the non-acknowledgement counter for the respective modulation;
    adjusting an outer-loop adjustment value of the modulation based on the estimated BLER of the modulation; and
    determining a final channel quality value by adding the outer-loop adjustment value to a measured channel quality value; and
    performing link adaptation based on the determined final channel quality value.

17. The method of claim 16, wherein the estimated BLER of the modulation is determined by calculating:

$$BLER=BLER_P*(1-a)+a*nack\_count/M; \text{ and}$$

$$BLER_P=BLER;$$

where:
BLER=the estimated BLER;
$BLER_P$=a previously estimated BLER;
a=a forgetting factor;
nack_count=the non-acknowledgement counter; and
M=a sum of the acknowledgement counter and the non-acknowledgement counter.

18. The method of claim 16, the MCS including the modulation is determined by a measured signal to interference plus noise ratio, SINR, plus the outer-loop adjustment value.

19. The method of claim 16, wherein adjusting the outer-loop adjustment value comprises:
    updating an upward step size for the modulation based on the acknowledgement counter and the non-acknowledgement counter.

20. The method of claim 19, wherein updating the upward step size uses one of a geometric mean method, an arithmetic mean method and a greedy method.

21. The method of claim 16, wherein the estimated BLER of the modulation is calculated for one of:
    each UE of the wireless communication network;
    a group of UEs of the wireless communication network; and
    all UEs in a cell of the wireless communication network.

22. The method of claim 16, wherein the modulation is one of a plurality of modulations, each of the plurality of modulations includes a corresponding target BLER.

* * * * *